United States Patent Office

2,697,518
Patented Dec. 21, 1954

2,697,518

FLOTATION METHODS FOR URANIUM ORES

George A. Bennett, Patchogue, N. Y., and Preston L. Veltman, Severna Park, Md., assignors to the United States of America as represented by the United States Atomic Energy Commission No Drawing. Application November 15, 1950,
Serial No. 195,904

8 Claims. (Cl. 209—166)

This invention relates to the treatment of uranium ores and, more particularly, to a flotation method for the concentration of uranium values from uranium ores.

The present emphasis on uranium as a source material for nuclear power has increased the desirability of a simple, inexpensive and rapid technique for recovering uranium values from ores. Flotation techniques have not generally been available. One method disclosed in U. S. Patent 2,000,656 to Armstrong and Menefee requires the use of soluble lead salts as promoters in addition to soaps, frothing agents and silica depressants.

It is an object of this invention to provide a method for the recovery of uranium values from ores and the like.

It is another object of this invention to provide a method for the concentration of uranium values from ores and the like by a flotation procedure.

It is still another object of this invention to provide a simple and improved method for the concentration of uranium values by a flotation procedure in which no promoters, frothers and depressants are required.

It is a still further object of this invention to provide a method for recovering uranium values from artificial ore-like materials such as earth materials containing uranium oxides and the like which have been inadvertently spilled thereon, earth materials containing uranium values scattered therein during testing procedures, or uranium values recovered from fluid systems by a sandfilter or the like.

Other objects and advantages of this invention will become apparent from the description and examples which follow.

The process of this invention is carried out by adding to an intimate mixture, or "pulp," of water and finely divided ore material, a material chosen from the class of anionic and non-ionic synthetic detergents, and soluble soaps, that is, soluble salts of fatty acids and rosin acids, and subjecting the resulting system to a flotation procedure.

Flotation procedures, which are of wide application in mineral dressing although they have not been generally applied to uranium ores, are believed to depend for their successful operation upon the selective wetting of portions of an ore, so that one portion of an ore material is readily wetted by the water of the pulp while another constituent of the ore material tends to become preferentially attached to bubbles of air which are passed through the agitated pulp. The mineral-loaded bubbles form a relatively stable froth, which may be removed by skimming or overflowing. The selective wetting is achieved with the aid of a variety of chemicals, collectively called flotation agents and typically called conditioners, collectors, frothers, promoters, and depressants, acocrding to their particular functions. By virtue of the interaction of some or all of these various agents, the collector being usually necessary, with the others serving to enable or enhance the action of the collector, the desired material acquires a water-repellent surface and readily becomes attached to an air bubble.

It has been found that the mineral values may be concentrated from a uranium bearing ore if a soap or anionic or non-ionic synthetic detergent is used as the sole agent in a flotation procedure. Conditions, which effect changes in the ore material so that the collector will function more effectively; frothers, which increase the foam-forming character of the system; promoters, which enhance the functioning of the collector; and depressants, which decrease the response of undesired materials to the flotation procedure, have not been found to make significant improvement in the results obtained in the present process by the use of the single agent of the class described. In view of the diversity of ore materials, there cannot be excluded the possibility that some addition to the process of this invention may in some especial instance show some improvement in operation; however the process of this invention is particularly directed toward the use of a single agent only, of the class of anionic and non-ionic synthetic detergents, and soluble soaps.

Individual detergents and soaps which are especially effective in carrying out the process of this invention are ethylene oxide polymers condensed with other organic residues, and alkali metal or other soluble salts of rosin acids and of relatively long-chain fatty acids, that is, chains comprising about eight or more carbon atoms. Examples of the polyethylene oxide type detergents are "Igepal CA," condensation product of ethylene oxide and alkylated cresol, and "Triton NE," polyoxyethylene ether of an alkylphenol.

Soaps which are effective in the process of this invention include sodium salts of such fatty acids as stearic acid, oleic acid, palmitic acid, lauric acid and the like, and the more generally available mixed fatty acids derived from animal and vegetable fats by saponification, and rosin soaps, such as the sodium salts of "abietic" acid, that is, the mixture of rosin acids which comprises a major proportion of abietic acid together with other isomeric compounds, modified "abietic" acid, and rosin acids recovered from tall oil. The rosin acids are advantageously employed together with the fatty acids in a composite soap such as tall oil soap. Other soluble soaps such as ammonium, potassium, and other alkali metal soaps are suitable but are not commonly employed because of expense and inconvenience.

Sulfonates and sulfates of long chain organic compounds are also moderately effective in the process of this invention. Typical sulfonated detergents are sulfonated alkylated aromatics such as sodium salts of sulfonated alkylbenzenes ("Nacconal" series, in which the alkyl group contains about fourteen carbon atoms, and the "Santomerse" series, in which the alkyl group contains about ten to about fourteen carbon atoms) or alkylnaphthalenes ("Nekal A," where the alkyl group is propyl, and "Nekal B or BX" where the alkyl group is butyl), and sulfonated esters such as sodium dioctyl sulfosuccinate. Sodium lauryl sulfate or the sodium salts from the sulfating of alcohols obtained by the reduction of coconut oil, or other oils and fats, and sodium salts of sulfates of long-chain mono-glycerides are typical long-chain sulfate detergents.

The various detergents of any type exhibit differences in behavior, and some one detergent or soap may be especially well-suited to the flotation of uranium values from a particular ore. As is well established in the flotation art, the details of selection of optimum conditions for the flotation of values from a particular ore cannot be set forth without consideration of the particular ore. The detailed adaptation of the general process of this invention to a particular ore lies within the scope of this invention.

Among the process variables in a flotation procedure is the amount of water to be mixed with the finely divided ore material in forming the pulp. The selection of the amount of water to be used involves a compromise among several influences. By virute of the nature of the equipment and processes used in steps preceding the flotation procedure, e. g., grinding, classifying, the pulp reaches the flotation step at a certain concentration. It is not convenient to decrease the amount of water in the pulp, as thickening or dewatering equipment would be required, and another step added to the over-all process. While the addition of water at the flotation step involves no extensive additional equipment, a proportionately greater amount of flotation agent is required in a thinner pulp, and the expense of the additional water and of its separation from the flotation tailings must be considered. Usual limits of pulp composition within which flotation procedures are carried out are about 15 per cent and about 50 per cent solids by weight.

There are many other process variables to be considered in establishing optimum or even practical operation of a flotation process. It may be desirable to add some or all of the agent or agents employed during the grinding process, or a conditioning period may be allowed after the addition to the pulp of the flotation agent and before frothing is performed. It is frequently desirable to operate the process at a temperature above that of the incoming materials. The agitation of the pulp and the supply of air bubbles must be adequate. The froth must be collected from the pulp, and broken so that the mineral may be recovered. Suitable froth-breaking means are high-pressure sprays, dilute acid, organic solvents, local application of heat, and the like. The use of the organic solvent, methyl ethyl ketone, has been found especially effective.

The froths from a flotation process are quite stable and not easily broken in contrast to the froth which would be obtained in pure water from the same material which is used as a flotation agent; the adsorption of the small mineral particles onto the surface of the bubbles appears to stabilize the froth. However, it is not desirable to achieve too stable a froth. In the first place, a stable froth is difficult and uneconomic in terms of recovery of mineral values therefrom. Further, if the froth be too stable, there can be no extensive exchange in the froth of undesired, less strongly adsorbed particles of gangue material for other particles of ore material of mineral value which have not yet been adsorbed.

As for pH of the system, usually important in processes involving surfaces, it is desirable that the pulp be neutral or slightly alkaline. Too acid a condition destroys the solubility of soap materials and adversely affects the operation of the process of the invention. However, if an acid-stable synthetic detergent be used without soap, slightly acid conditions can be tolerated. It also should be pointed out that there is generally an optimum concentration for any particular flotation agent in the given ore system. Better results are obtained at this optimum concentration than at concentrations either higher or lower than this level. This optimum concentration lies in general slightly above the minimum concentration necessary for the formation of froth. The usual amount of flotation agent used in flotation processes is of the order of 0.1 pound to 10 pounds per ton of material to be treated; the process of this invention has been advantageously operated in the range of 0.4 pound to 3 pounds of flotation agent per ton of ore material.

It should be further noted that, while not necessary to the process of the invention, the addition of promoters, gangue depressants, frothers and the like, may not always interfere and may, in some instances, yield minor advantages. Most satisfactory results, however, have been obtained with simply the flotation agents disclosed, that is, with anionic and non-ionic synthetic detergents and soluble salts of fatty acids and rosin acids.

The following examples of the adaptation of the process of this invention to the flotation of uranium values from a particular gangue are given by way of illustration only and are intended to be limiting in no way upon the scope of the invention.

*Example I*

An artificial ore sample comprising 1 kilogram of finely divided sand, a portion of which has been impregnated with uranyl nitrate equivalent in amount to 20 grams of uranium, and then dried and ignited to leave a residue of uranium oxide thereon, is charged to a single cell batch flotation unit with a working volume of three and a half liters. One-tenth gram of Igepal CA is added to the mixture per liter of solution. Agitation is begun and, after a very brief period, air is admitted to the cell. Within five minutes, 75 per cent of the uranium charged to the cell has been recovered, with a gangue carry-over of 10 per cent of the gangue charged.

*Example II*

One kilogram of a mixture of sand and uranium oxides, in the proportion of 100:1, is treated in the apparatus of Example I, using 0.85 grams of sodium oleate as the flotation agent. After five minutes, 70 per cent of the uranium value has been recovered, with about a 32 per cent gangue carry-over.

*Example III*

To illustrate the advantage of the simple process of this invention, generally avoiding the use of additional agents, the process as in Example II is repeated except that 10 milliliters of a solution of 40 degrees Baumé sodium silicate are added to the system to depress the gangue carry-over. After thirty minutes operation, only 50 per cent of the uranium value has been recovered, and the gangue carry-over is about 15 per cent: while the depressant has decreased the gangue carry-over, the effectiveness of recovery of mineral value has been comparably depressed.

The above examples are to be taken as illustrative only; the scope of the invention is not to be limited except as indicated in the appended claims.

What is claimed is:

1. The process of recovering uranium values from artificial ore-like materials containing uranium oxides which comprises pulping the finely divided material with a solution consisting of water together with at least one flotation agent chosen from the class consisting of anionic and non-ionic synthetic detergents and soluble soaps of fatty acids and rosin acids, said solution being devoid of other conditioners, frothers, promoters, and depressants, and subjecting said pulp to flotation procedure, whereby the uranium values are concentrated in the froth and may be recovered therefrom.

2. The process of claim 1 in which the flotation agent is a non-ionic synthetic detergent.

3. The process of claim 1 in which the flotation agent is an anionic synthetic detergent.

4. The process of claim 1 in which the flotation agent is an alkali metal salt of at least one fatty acid.

5. The process of claim 1 in which the flotation agent is the alkali metal soap of a rosin acid.

6. The process of claim 1 in which the flotation agent is the alkali metal soap of mixed rosin and fatty acids.

7. The process of claim 1 in which the flotation agent is a polyethylene oxide-organic residue condensate.

8. The process of claim 1 in which the flotation agent is the sodium salt of mixed fatty acids comprising a major proportion of unbranched chains containing about eighteen carbon atoms.

References Cited in the file of this patent

UNITED STATES PATENTS

| Number | Name | Date |
| --- | --- | --- |
| 2,000,656 | Armstrong et al. | May 7, 1935 |
| 2,570,119 | Handley et al. | Oct. 2, 1951 |
| 2,570,120 | Handley et al. | Oct. 2, 1951 |

OTHER REFERENCES

U. S. Bureau of Mines, Bulletin 449, printed 1944, page 6. (Copy in Scientific Library.)

U. S. Bureau of Mines Report of Investigations 3370, pp. 92–96. (Copy in Scientific Library.)